United States Patent
Shew

(10) Patent No.: US 7,249,695 B2
(45) Date of Patent: Jul. 31, 2007

(54) GREASE GUN

(75) Inventor: Jerry D. Shew, Charlotte, NC (US)

(73) Assignee: Alemite, LLC, Fort Mill, SC (US)

( * ) Notice: Subject to any disclaimer, the term of this patent is extended or adjusted under 35 U.S.C. 154(b) by 446 days.

(21) Appl. No.: 10/904,204

(22) Filed: Oct. 28, 2004

(65) Prior Publication Data

US 2006/0091159 A1    May 4, 2006

(51) Int. Cl.
*B65D 88/54*    (2006.01)
(52) U.S. Cl. ............................ 222/333; 222/258
(58) Field of Classification Search ............... 222/333, 222/334, 1, 63, 258, 256, 261, 262, 263
See application file for complete search history.

(56) References Cited

U.S. PATENT DOCUMENTS

| | | | |
|---|---|---|---|
| 1,964,005 A | | 6/1934 | Morton |
| 2,001,190 A | | 5/1935 | Ginter |
| 2,626,085 A | | 1/1953 | MacKinnon |
| 2,686,281 A | | 8/1954 | Shum |
| 2,928,574 A | * | 3/1960 | Wagner ..................... 222/108 |
| 3,652,879 A | | 3/1972 | Plunkett et al. |
| 3,807,606 A | * | 4/1974 | Foerst et al. ............... 222/262 |
| 3,818,255 A | | 6/1974 | Wagner |
| 3,818,930 A | * | 6/1974 | Crum et al. ................ 137/341 |
| 3,829,721 A | | 8/1974 | Rosenthal, Jr. |
| 3,871,069 A | | 3/1975 | Grieb |
| 3,959,677 A | | 5/1976 | Grieb |
| 3,995,703 A | | 12/1976 | Wanner |
| 4,094,365 A | | 6/1978 | Wanner |
| 4,257,540 A | * | 3/1981 | Wegmann et al. .......... 222/262 |
| 4,272,996 A | | 6/1981 | Sauerwein |
| 4,276,941 A | | 7/1981 | Wanner et al. |
| 4,314,170 A | | 2/1982 | Sahrbacker |
| 4,639,202 A | | 1/1987 | Mahanay et al. |
| 4,893,995 A | | 1/1990 | Hufstader |
| 5,052,497 A | | 10/1991 | Houben et al. |
| 5,105,912 A | | 4/1992 | Heister |
| 5,113,951 A | | 5/1992 | Houben et al. |

(Continued)

FOREIGN PATENT DOCUMENTS

GB    601 451    5/1948

(Continued)

OTHER PUBLICATIONS

Search Report for PCT/US2005/038739 dated Feb. 27, 2006.

*Primary Examiner*—Lien M. Ngo
(74) *Attorney, Agent, or Firm*—Dickstein Shapiro LLP

(57) ABSTRACT

A battery-powered grease gun is provided for enhancing the pressure applied to a blocked grease fitting. The grease comprises a circuit interconnecting the battery and an electric motor. The circuit includes a switch operable by a user and a thermal protector for breaking the circuit at a predetermined temperature. When applying grease to a blocked grease fitting, actuating the switch until the thermal protector reaches the predetermined temperature breaks the circuit until the motor cools and the thermal protector resets for completing the circuit and again energizing the motor. Continuing to maintain the switch in the actuated position until the thermal protector resets causes the pressure in the grease gun to increase with each cycle of the thermal protector.

8 Claims, 9 Drawing Sheets

U.S. PATENT DOCUMENTS

| | | |
|---|---|---|
| 5,404,967 A | 4/1995 | Barry |
| 5,556,009 A | 9/1996 | Motzko |
| 5,609,274 A | 3/1997 | Shih et al. |
| 5,614,774 A | 3/1997 | McCallops et al. |
| 5,624,000 A | 4/1997 | Miller |
| 5,685,462 A | 11/1997 | Barry |
| 5,747,900 A | 5/1998 | Nakamura et al. |
| 5,780,946 A | 7/1998 | Nakamura et al. |
| 5,798,584 A | 8/1998 | Schaeffeler et al. |
| 5,909,830 A | 6/1999 | Bates et al. |
| 5,911,281 A | 6/1999 | Treskog et al. |
| 6,043,575 A | 3/2000 | Ghode et al. |
| 6,113,360 A | 9/2000 | Yu et al. |
| 6,123,235 A | 9/2000 | Hsu |
| 6,135,327 A * | 10/2000 | Post et al. .................. 222/333 |
| 6,226,877 B1 | 5/2001 | Ono |
| 6,443,675 B1 | 9/2002 | Kopras et al. |
| 7,004,357 B2 * | 2/2006 | Shew ......................... 222/256 |
| 2001/0004172 A1 | 6/2001 | Sakurai et al. |
| 2002/0067147 A1 | 6/2002 | Glasgow et al. |
| 2002/0089240 A1 | 7/2002 | Du |
| 2003/0212153 A1 | 11/2003 | Gervais et al. |
| 2004/0045982 A1 | 3/2004 | Herman et al. |
| 2004/0226969 A1 | 11/2004 | Shew |
| 2004/0231927 A1 | 11/2004 | Huang et al. |

FOREIGN PATENT DOCUMENTS

| | | |
|---|---|---|
| GB | 1 210 199 | 10/1970 |

* cited by examiner

GREASE GUN

BACKGROUND

This invention generally relates to power tools and, more particularly, to portable, electrically-powered power tools, such as, for example, for pumping fluids as in a handheld battery-powered grease gun.

A conventional handheld battery-powered grease gun generally comprises a housing including a head portion and a handle portion extending transversely from the head. A cylindrical barrel holding a supply of grease is removably secured to the head and extends from the head alongside the handle. The head portion includes a pump mechanism including a piston that reciprocates in a bore that forms a pump cylinder. The head portion has an inlet port in communication with the bore and the material in the barrel and an outlet port at one end of the bore to a flexible hose for delivering grease to a point of lubrication.

An electric motor is accommodated in the housing and a gear transmission mechanism is provided between the motor and the pumping mechanism for changing the rotating motion of the motor output shaft to the linear reciprocating motion of the piston while reducing the rotational speed and increasing torque. The transmission of these type mechanisms usually ends in a rotary crank plate having an eccentrically located crank pin that is drivingly disposed within a slot of a reciprocating yoke coupled to the piston. This arrangement has been used primarily in jigsaws, which are the most common type of power tool employing a reciprocating drive mechanism. Batteries to power the motor and the switch to control the operation of the power tool are also found in the housing.

In a battery-powered grease gun, the transmission is needed for dispensing grease under pressure. In order for the grease gun to perform satisfactorily, significant force must be exerted. This requirement has led to the development of large, heavy power transmission mechanisms, resulting in awkward and difficult to handle grease guns. The power requirement also reduces the life cycle of the rechargeable battery. Moreover, since the transmission drive system includes numerous components, the manufacturing is relatively complicated and costly.

Another problem that effects all power tools, including a battery-powered grease gun, is heat build-up within the housing during use of the power tool. Heat build-up can shorten the life of the motor and other moving parts, and is particularly a problem when a housing is made of plastic. Thus, care must be taken to ensure good heat dissipation. For this reason, the electric motor used in power tools typically includes a fan for cooling air circulation. Conventionally, the fan is mounted on the motor armature shaft for generating air flow through openings in the motor and the tool housing. Vents in the tool housing facilitate air flow between the interior of the housing and the atmosphere. The need for good cooling air flow around the motor necessitates placing the motor in a position in the housing to allow sufficient air flow around and through the motor. Unfortunately, the motor position necessitates an arrangement that results in an unfavorably located center of gravity which does not facilitate overall handling of the power tool.

Yet another problem that effects all grease guns, whether battery-powered or manual, is blocked, or "frozen", grease fittings. The frozen fitting will not allow grease from the grease gun to reach a desired point of lubrication. Occasionally, the frozen fitting can be cleared if enough pressure can be generated by the grease gun. However, a conventional battery-powered grease gun generates only from about 2900 psi to about 6000 psi of pressure, which often is not sufficient to overcome the frozen fitting. As a result, the defective fitting is usually removed and cleaned or replaced.

For the foregoing reasons, there is a need for a power transmission which is compact, yet efficient and powerful enough to be used in power tools, such as battery-powered grease gun. There is also a need for improved cooling in power tools so as to allow more convenient placement of the motor. Ideally, the motor could be positioned in the handle to further reduce the size and improve the handling of the power tool. There is also a need for a battery-powered grease gun which generates a high output pressure for potentially overcoming frozen grease fittings.

SUMMARY

According to the present invention, a grease gun is provided for enhancing the pressure applied to a blocked grease fitting. The grease gun comprises a housing including a handle portion and a head portion. The head portion has a bore forming a pump cylinder, and an inlet passage and an outlet passage extending from the exterior of the head portion and opening into the bore. The outlet passage opens into the bore at a point axially spaced in a first direction from the opening of the inlet passage into the bore. A grease supply cylinder is sealingly secured to the head portion so that the bore is in fluid communication with the grease in the supply cylinder. An electric motor is provided as well as a battery for energizing the motor and a circuit interconnecting the battery and the motor. The circuit includes a switch operable by a user for manually activating the motor when the switch is actuated and a thermal protector for breaking the circuit at a predetermined temperature. A transmission is operably connected to the motor. The transmission comprises a planetary gear assembly including an output gear and a drive gear meshing with the output gear. The drive gear includes a drive pin eccentrically mounted on a face of drive gear. The drive pin is received in a cam slot in a yoke for reciprocation of the yoke by the drive pin upon rotation of the drive gear. A piston is fastened to the yoke at one end and the other end of the piston is slidably disposed in the bore for reciprocal movement relative to the housing. The piston is movable between a first position axially spaced in a second direction from the opening of the inlet passage into the bore and a second position past the inlet passage opening in the first direction. The piston moves toward the outlet passage opening in the first direction through a pumping stroke for forcing the grease in the bore out through the outlet passage opening. The piston moves away from the outlet passage and past the inlet passage opening in the second direction through a return stroke for priming the bore. When the switch is continuously actuated, the thermal protector cycles between an open circuit condition and a closed circuit condition when the discharge hose is connected to a blocked grease fitting. The pressure in the bore and discharge hose increase each time the thermal protector resets to the closed circuit condition up to a maximum pressure.

Also according to the present invention, a method is provided for operating the grease gun. The grease gun operating method comprises the steps of providing a thermal protector for breaking the circuit at a predetermined temperature, actuating the switch, maintaining the switch in the actuated position until the thermal protector reaches the predetermined temperature and breaks the circuit, and continuing to maintain the switch in the actuated position until the thermal protector resets for completing the circuit and again energizing the motor. This method causes the pressure in the grease gun to increase with each cycle of the thermal protector.

BRIEF DESCRIPTION OF THE DRAWINGS

For a more complete understanding of the present invention, reference should now be had to the embodiments shown in the accompanying drawings and described below. In the drawings.

DESCRIPTION

Figure 1:
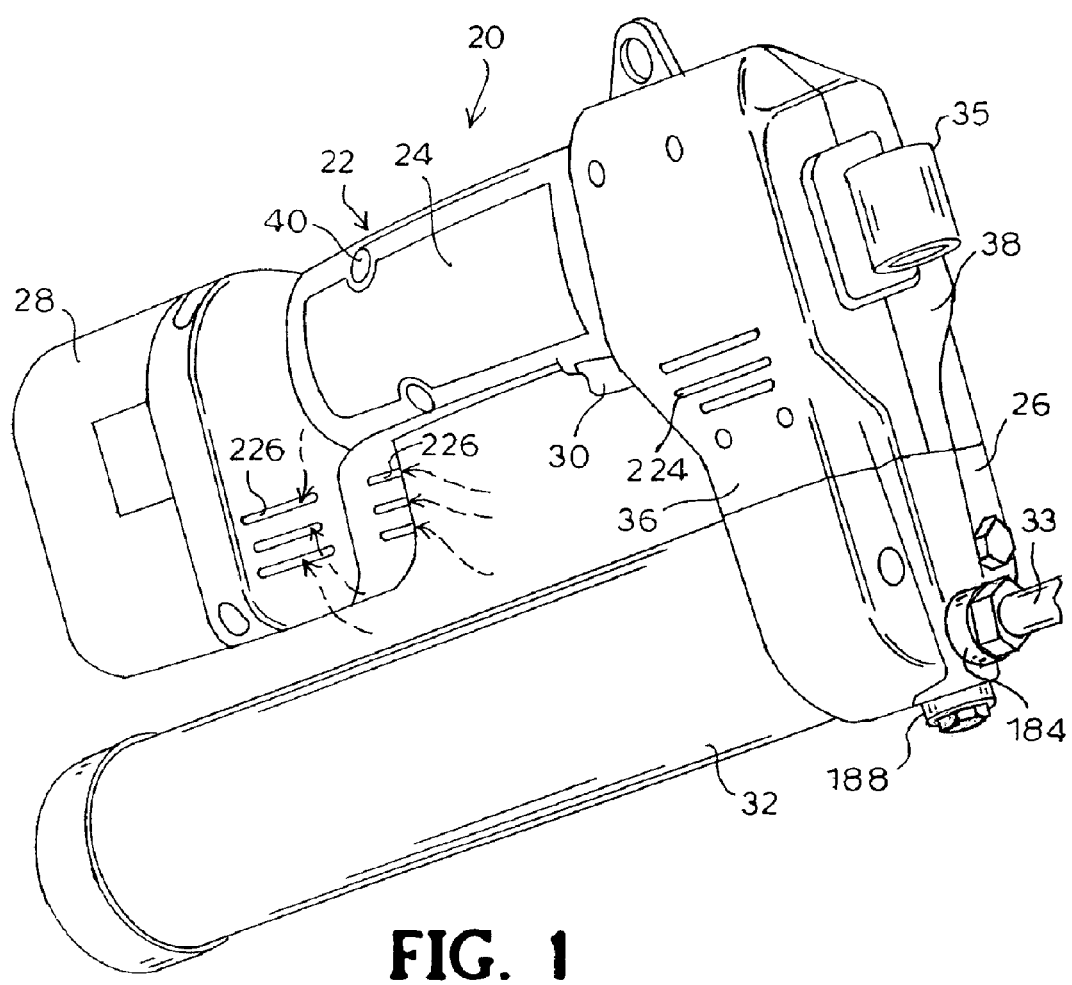
FIG. 1 is a perspective view of a battery-powered grease gun according to the present invention.

Certain terminology is used herein for convenience only and is not to be taken as a limitation on the invention. For example, words such as "upper," "lower," "left," "right," "horizontal," "vertical," "upward," and "downward" merely describe the configuration shown in the Figures. Indeed, the components may be oriented in any direction and the terminology, therefore, should be understood as encompassing such variations unless specified otherwise.

Referring now to the drawings, wherein like reference numerals designate corresponding or similar elements throughout the several views, an embodiment of the present invention is shown in the form of a battery-powered grease gun, designated generally at 20. It is understood that, although the present invention will be described in detail herein with reference to the exemplary embodiment of the battery-powered grease gun 20, the present invention may be applied to, and find utility in, other portable, hand-held power tools. As described above, electric motors are used in a wide variety of applications involving power tools such as, for example, drills, saws, sanding and grinding devices, yard tools such as, for example, edgers and trimmers, and the like. Further, although the present invention will be described in detail herein as embodied in a power tool wherein rotating motion of the electric motor is converted to linear reciprocating motion, it is not intended to be so limited. The present invention may be used in rotary power tools, such as power drills, screw drivers, and the like, and in kitchen appliances such as, for example, mixers and blenders. Thus, the present invention has general applicability to any device powered by an electric motor wherein improvements in efficiency and cooling are desired.

Referring now to FIG. 1, the grease gun 20 comprises a housing 22, including a rear handle portion 24 and a front head portion 26. The housing 22, as viewed from the side, is generally L-shaped with the handle 24 extending transversely from an upper end of the head 26. The handle 24 is generally tubular and of a length somewhat greater than the width of a human hand, and of a girth such that the handle 24 may be readily grasped in the hand of the user. The handle 24 may be contoured so that the handle 24 may be grasped comfortably. A rechargeable battery pack 28 is mounted to the housing 22 at the rear end of the handle 24. A manually operated trigger 30 extends from an opening in the side of the handle 24. In this position, the trigger 30 can be selectively operated by manual manipulation by the user gripping the handle 24 to control the flow of electric current from the battery pack 28 to an electric motor (not shown in FIG. 1) in the housing 22.

A tubular reservoir 32 is removably secured to the housing 22 at a lower end of the head 26 for holding a supply of grease. The reservoir 32 is aligned substantially parallel with the longitudinal axis of the handle 24. It is understood that the term "substantially parallel" as used in this context throughout this specification means more parallel than not. A discharge hose 33 extends from the lower end of the head 26 for delivering grease to desired points of lubrication. It is understood that a wide variety of fluids other than grease, or other lubricant, can be dispensed according to the present invention, such as, for example, sealants such as caulk, glue, cake frosting as well as other high viscosity fluids or semi-solid materials that require high pumping pressure to achieve adequate flow rates.

Figure 2:
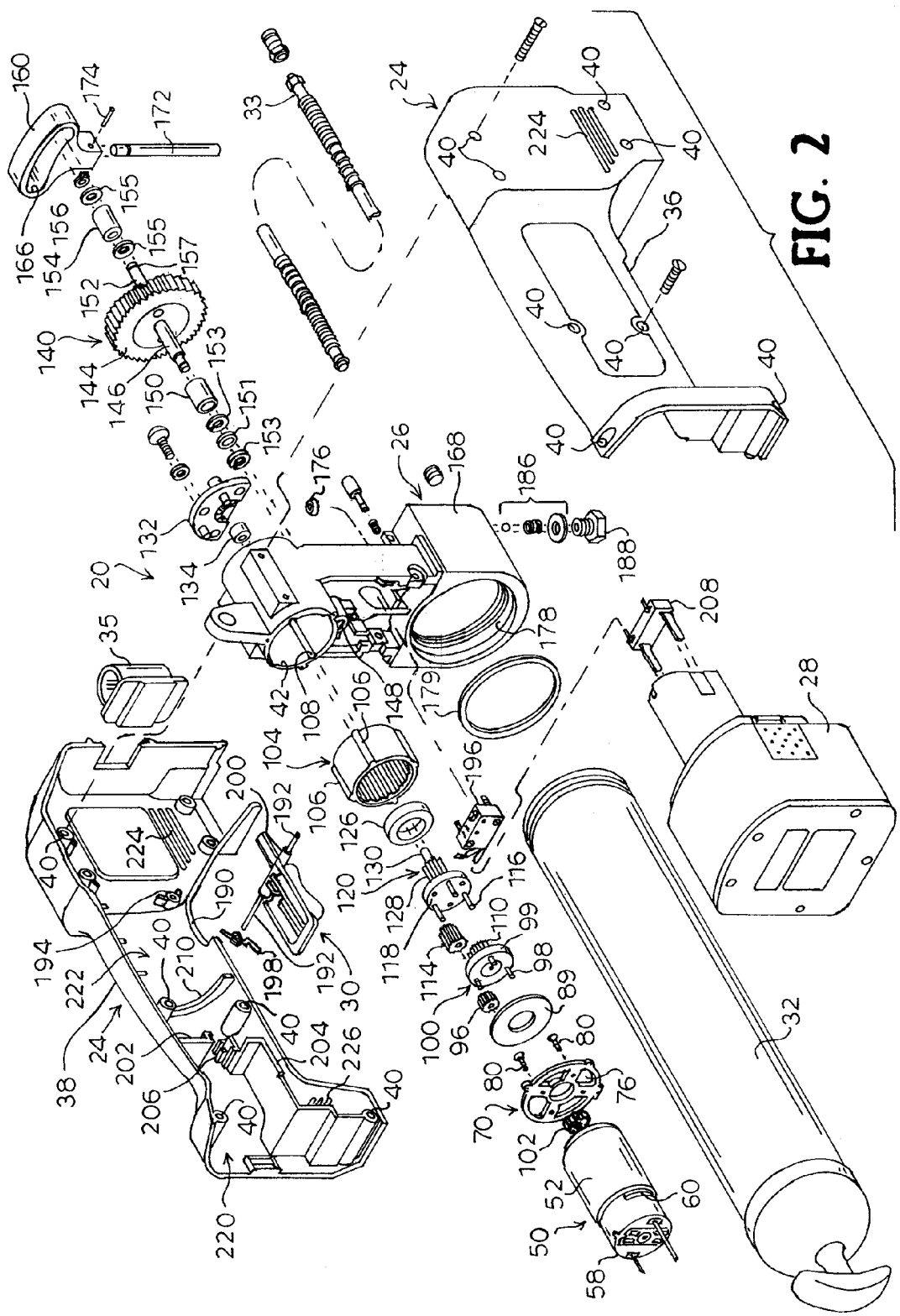
FIG. 2 is an exploded view of the battery-powered grease gun shown in FIG. 1.

As best seen FIG. 2, the handle 24 may be formed as two complementary, symmetric parts such that the handle 24 is in effect split in half along a central longitudinal plane forming a right hand handle part 36 and a left hand handle part 38, as viewed by the user holding the gun in his right hand with the head 26 at the top. The two handle parts 36, 38 are joined together in a conventional manner using fasteners, such as screws, an adhesive, welding, or a combination thereof. As depicted in the present embodiment, screw holes 40 are formed in the two handle parts 36, 38 for fastening the handle parts together. The handle 24 may be made of various materials, including plastics or metals. Preferably, the handle 24 is made of an electrically insulating material with low heat conductivity, such as hard plastic.

The head 26 is generally a rectangular shape with rounded corners and parallel side walls extending between and interconnecting irregular front and rear walls. The upper end of the head 26 has a cylindrical pass through opening 42. The head 26 is preferably a metal casting.

Figure 3:
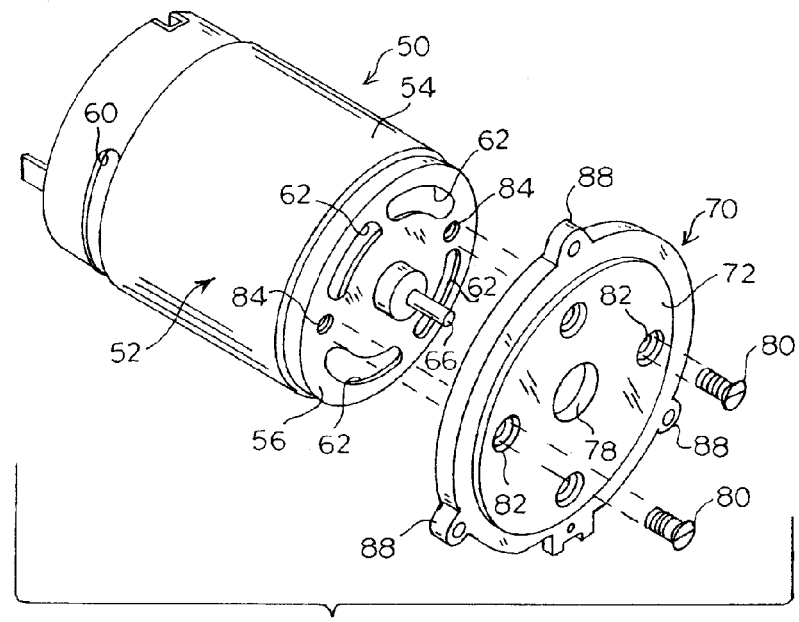
FIG. 3 is an exploded perspective view of an electric motor and mounting plate for use in the battery-powered grease gun according to the present invention.

Referring now to FIGS. 2 and 3, the electric motor 50 includes a substantially cylindrical motor housing 52 having a side wall 54 with an external surface, a front end wall 56 and a rear end wall 58. The side wall 54 has two diametrically opposed, circumferentially-extending air ports 60 opening at the external surface of the motor housing 52. The front end wall 56 has four spaced air ports 62. An axial rotary output shaft 66 extends from the front end wall 56 of the motor housing 52. A fan (not shown) is located within the motor housing 52 and attached to the motor shaft 66. Preferably, the fan is an impeller type fan.

Figure 4:
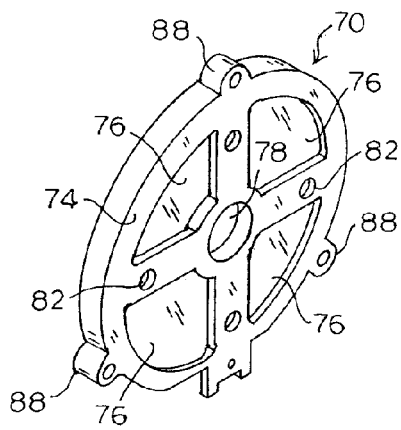
FIG. 4 is a perspective view from the other side of the mounting plate shown in FIG. 3.
Figure 5:
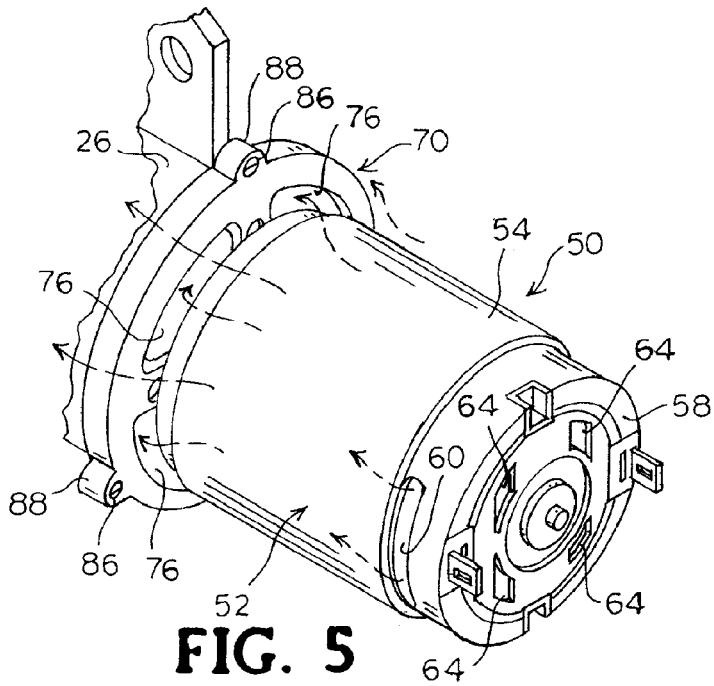
FIG. 5 is a perspective view of an electric motor mounted in the battery-powered grease gun according to the present invention, with surrounding components cut-away.
Figure 6:
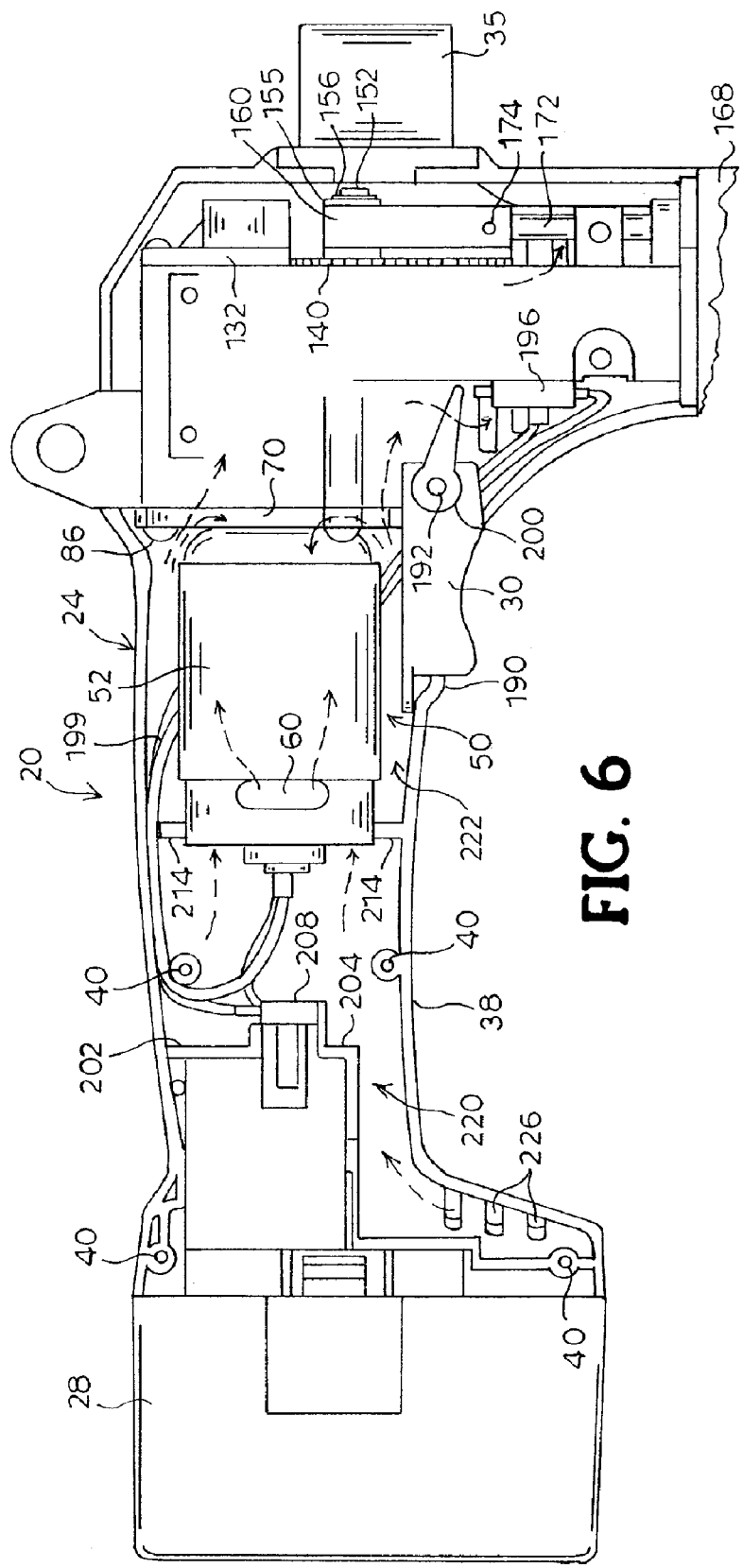
FIG. 6 is a side elevation fragmentary view of the battery-powered grease gun shown in FIG. 1 with the right handle part removed.

A circular mounting plate 70 is provided for securing the motor 50 in the handle 24. The mounting plate 70 has front surface 72 and a rear surface 74 (FIG. 4). The rear surface 74 of the mounting plate 70 has four circumferentially spaced recesses 76 having a substantially triangular shape. The mounting plate 70 is adapted to be fastened to the front end wall 56 of the motor housing 52 with the motor shaft 66 extending through a central opening 78 in the mounting plate 70. The mounting plate 70 is positioned relative to the motor housing 52 such that the apertures 76 in the rear surface 74 of the mounting plate 70 are aligned with the air ports 62 in the front end wall 56 of the motor housing 52. The mounting plate 70 is fastened to the motor housing 52 using screws 80 which pass through holes 82 in the mounting plate 70 and are received in threaded openings 84 in the front end wall 56. The motor housing 52 with attached mounting plate 70 is aligned with the opening 42 in the upper end of the head 26, as best seen in FIGS. 5 and 6. The mounting plate 70 is fastened to the head 26 using screws 86 which pass through openings in ears 88 circumferentially spaced on the periphery of the mounting plate 70 and are received in threaded openings in the head 26. The mounting plate 70 is large enough to cover the opening in the head portion. A washer 89 (FIG. 2) is positioned between the mounting plate 70 and head 26. As seen in FIG. 5, the rear end wall 58 of the motor housing 52 has four spaced air ports 64. When the motor 50 is operating, the fan rotates to draw air through the air ports 62, 64 in the front and rear end walls 56, 58 of the motor housing 52 to cool the motor 50. Warmed air is exhausted from the motor housing 52 through the side wall air ports 60. A suitable motor for use in a power tool according to the present invention is available from Johnson Electric Engineering Ltd. of Hong Kong, and sold as model number HC683LG.

Figure 7:
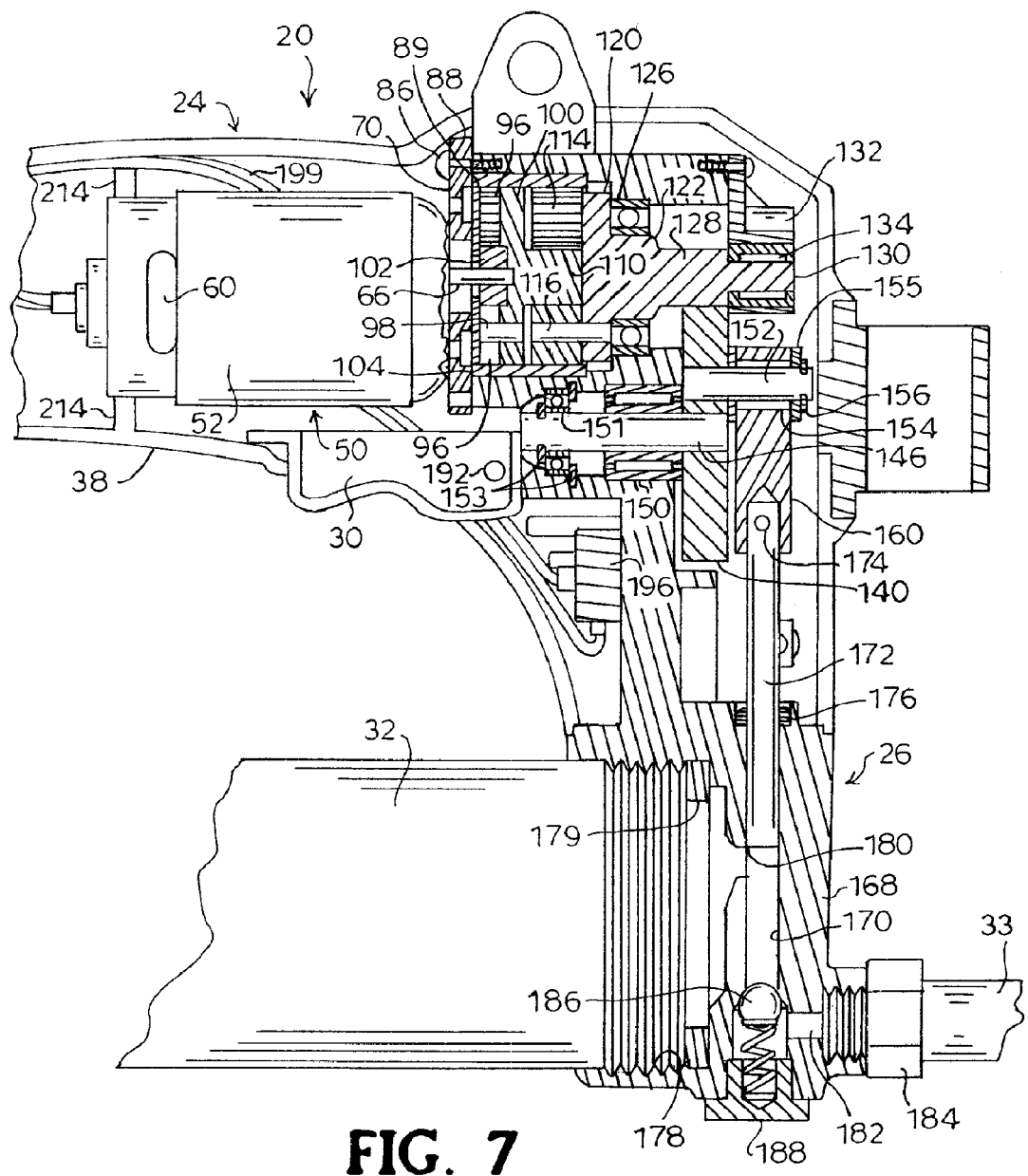
FIG. 7 is a partial cross-section fragmentary view of the battery-powered grease gun shown in FIG. 1.

The motor 50 drives a transmission that drives a pump assembly for pumping grease under pressure from the reservoir 32 through the discharge hose 33. In one embodiment of the present invention, the transmission comprises a planetary gear reduction system, preferably a two-stage planetary gear reduction system housed in the opening 42 in the upper end of the head 26, which serves as a gear housing. Referring to FIGS. 2 and 7, a first planetary gear set of the planetary gear system includes three planet gears 96 (only one of which is shown in FIG. 2) rotatably mounted on pins 98 extending from a rear surface 99 of a first carrier 100. A pinion gear 102 is press fit onto the distal end of the motor shaft 66 and forms a part of the transmission. The pinion gear 102 fits between and meshes with the three planet gears 96 on the first carrier 100. The three planet gears 96 also mesh with an orbit gear 104 fixed in the opening 42 in the head 26. The orbit gear 104 has four longitudinal ridges 106 (FIG. 2) circumferentially spaced about the periphery. The head 26 has corresponding longitudinal slots 108 formed in the wall defining the upper opening 42 for non-rotatably receiving the orbit gear 102.

A sun gear 110 is axially mounted to a front surface of the first carrier 100 for rotation with the first carrier. The sun gear 110 meshes with and drives three planet gears 114 (only one of which is shown in FIG. 2) of a secondary planetary gear set of the transmission. The second set of planet gears 114 are rotatably mounted on pins 116 extending from a rear surface 118 of a second carrier 120 and also mesh with the orbit gear 104. An axial reduced diameter shoulder 122 extends forwardly from a front surface of the second carrier 120. A roller bearing 126 is positioned between the cylindrical peripheral surface of the shoulder 122 and the interior surface of the head 26. An output gear 128 is fixed to the second carrier 120 at a front surface of the shoulder 122 for rotation with the second carrier 120. An axial shaft 130 extends from the spur gear 128 and is received in a bore in a semi-circular bracket 132 fastened to the front wall of the head 26. The shaft 130 is supported for rotation in the bracket 132 by a needle bearing 134.

A drive gear 140 is provided at the forward end of the transmission. An axial shaft 146 extends from a rear surface 144 of the drive gear 140 and is rotatably received in a pass through axial bore 148 in the head 26 below the upper opening 42. The axial shaft 146 is supported in the bore 148 by a needle bearing 150 and a ball bearing 151 positioned between two retaining clips 153. The front clip 153 fits in a groove in the interior surface of the bore 148 for maintaining the ball bearing 151 in the bore 148. The rear clip 153 fits in a groove in the shaft 146 for maintaining the axial position of the shaft 146. An eccentrically mounted shaft 152 extends transversely from the front surface of the drive gear 140. A hollow cylindrical drive pin 154 is mounted for rotation on the eccentric shaft 152 between two washers 155. A retaining clip 156 fits into a groove 157 in the end of the shaft 152 to hold the drive pin 154 in place.

Figure 8:
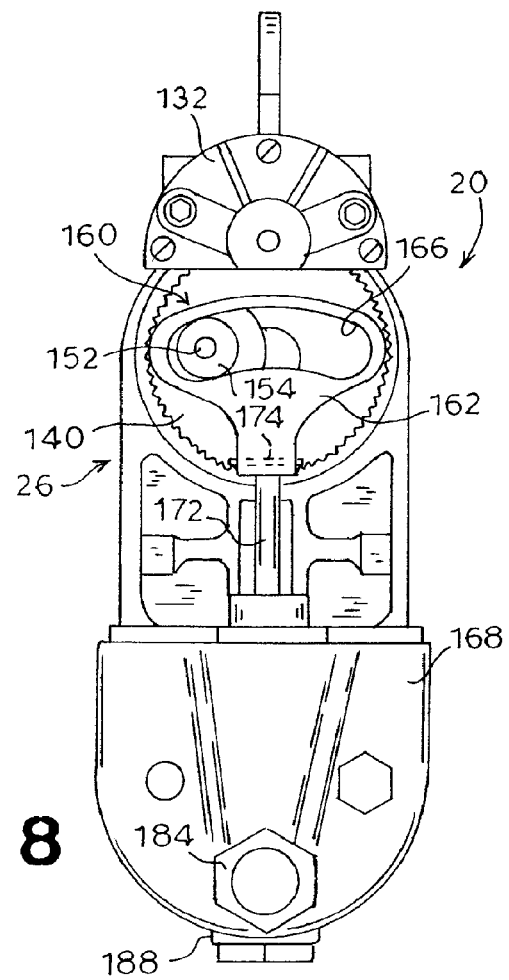
FIG. 8 is an end elevation view of the battery-powered grease gun shown in FIG. 1 with the handle portion of the housing removed.

As shown in FIGS. 7 and 8, a yoke 160 is positioned adjacent to the front surface of the drive gear 140. The yoke 160 is substantially heart-shaped. A curved oblong cam slot 166 is formed in the yoke 160. The cam slot 166 is dimensioned to receive the drive pin 154, allowing sufficient room to enable the drive pin 154 to slide freely through the cam slot 166 from end to end. As depicted in the Figures, a scotch yoke design having a track configuration that minimizes the side load forces imposed on the yoke 160 is preferred. However, it is understood that the configuration of the cam slot 166 may be straight, with the length of the slot 166 equal to the diameter of the circle traced by the drive 154 pin.

Referring again to FIG. 7, the pump assembly comprises a pump chamber 168 including the lower end of the head 26. The pump chamber 168 defines a cylindrical bore 170 which, as will be described below, is in fluid communication with the reservoir 32 of grease and the discharge hose 33. The pump chamber bore 170 receives a plunger 172 in sliding engagement with the interior surface of the bore 170. The plunger 172 extends upwardly through an opening in the pump chamber 168. The distal end of the plunger 172 is received in an opening in the yoke 160 and secured in place with a pin 174. A resilient seal 176 is positioned in an annular recess in the opening in the pump chamber 168 and surrounds the plunger 172 for sealing the pump chamber 168.

The pump chamber 168 has a circular threaded flange 178 that is internally threaded for receiving an externally threaded open end of the reservoir 32. A gasket 179 is seated between the head 26 and the reservoir 32 for sealing the connection. The operation of the grease reservoir 32 may be typical of a conventional grease gun that is either manually or battery-powered. Therefore the interior of the reservoir 32 is not shown in the drawings. The grease supply in the reservoir 32 is in fluid communication with the bore 170 via an inlet passage 180 formed in the pump chamber 168 and extending from the recess 178 and opening into the bore 170. An outlet passage 182 is spaced downward from the inlet passage 180 and extends from the bore 170 to a fitting 184 to which the discharge hose 33 is connected. A ball check valve assembly 186 is positioned in the pump chamber 168 at the end of the bore 170, and is held in place by a threaded plug 188.

As shown in FIGS. 2 and 7, the handle 24 has an opening 190 to accommodate the trigger 30. The trigger 30 has transverse arms 192 that rotatably fit into opposed bosses 194 in the handle 24 so that the trigger 30 will pivot relative to the handle 24. A paddle 200 extends forwardly from one of the trigger arms 192. An electrical switch 196 is mounted in the handle 24 adjacent to the trigger 30. A torsion spring 198 is mounted around one of the trigger arms 192. One end of the spring 198 engages the trigger 30 and the other end of the spring engages the interior of the handle 24 for biasing the trigger 30 outwardly of the handle and away from the switch 196 in an "off" position. Two wires carry power from the battery pack 28 to the motor 50. When the trigger 30 is actuated by the user, the trigger 30 pivots inwardly against the biasing action of the spring 198. The paddle 200 contacts the switch 196 for moving the switch to an "on" position. When the user releases the trigger 30, the spring 198 operates to pivot the trigger 30 back to the off position.

In use, the user grips the handle 24 and manually manipulates the trigger 30 to energize the motor 50, rotating the motor shaft 66 and pinion gear 102. Rotation of the pinion gear 102 is transmitted through the transmission causing the drive gear 140 to rotate at a reduced speed of rotation and at an increased torque from that of the pinion gear 102. The rotation of the drive gear 140 is transmitted to the yoke 160 by the action of the drive pin 154 engaging the inside peripheral surface of the cam slot 166 for reciprocating the yoke 160 and plunger 172.

The plunger 172 reciprocates in the bore 170 of the pump chamber 168 through a pressure stroke and a return stroke. On the pressure stroke, the plunger 172 moves in the bore 170 in a downward direction, as seen in FIG. 7, past the inlet passage 180 and toward the outlet passage 182. Grease in the bore 170 is thus pushed toward the outlet passage 182. Pressure on the grease increases until the ball check valve 186 is unseated and grease under pressure passes through the outlet passage 182 and is discharged through the hose 33. Once the pressure stroke has been completed, the plunger 172 is retracted upward, as seen in FIG. 7, away from the outlet passage 182 and back across the inlet passage 180 thereby allowing more grease to enter into the bore 170.

As best seen in FIGS. 7 and 8, the bracket 132 partially closes the opening in the upper end of the head 26. This maintains the axial relationship of the components of the transmission and resists any tendency of the drive gear 140 to tilt or skew relative to its central axis due to forces exerted by the yoke 160 against the drive pin 154 during rotation of the drive gear 140. As described above, it is understood that other power tools may use this transmission arrangement, including tools with rotating drives wherein rotary movement may continue through to a chuck which is adapted to drive a suitable bit or implement that comes into engagement with the work.

Figure 12:
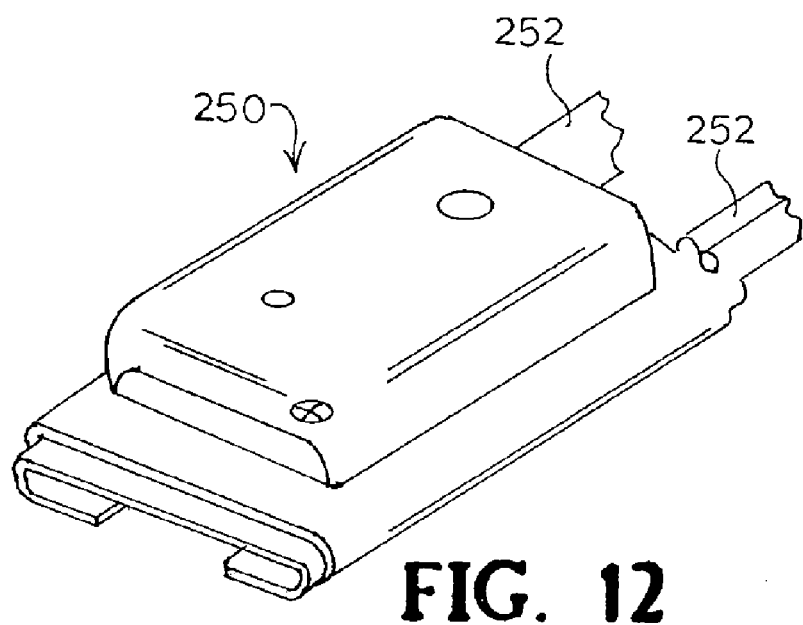
FIG. 12 is a perspective view of a thermal protector for use in a battery-powered grease gun according to the present invention.
Figure 13:
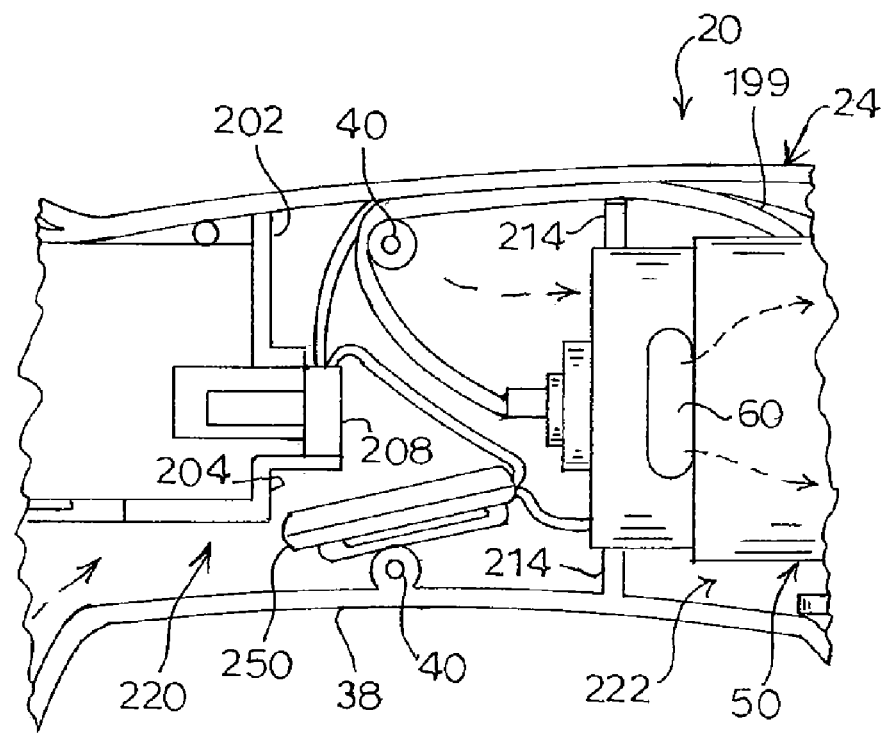
FIG. 13 is a side elevation fragmentary view of the thermal protector shown in FIG. 12 mounted in the battery-powered grease gun according to the present invention.

In another embodiment of a battery-powered grease gun according to the present invention, a thermal protector is used to enhance the pressure generated by the grease gun 20. A thermal protector for this purpose is shown in FIG. 12 and generally designated at 250. The thermal protector 250 includes two terminals 252 at one end for electrically connecting the thermal protector 250 to wire leads. Referring to FIG. 13, the thermal protector 250 is shown in position in the left hand handle part 38 of the handle 24 upstream of the motor 50 in the chamber 220 formed in the rear portion of the handle 24. The thermal protector 250 is electrically connected between the contact assembly 208 and the motor 50 to control the flow of electric current from the battery pack 28 to the motor 50. Specifically, one of the wires carrying power from the contact assembly 208 to the battery pack 28 leads through the thermal protector 250 to the motor 50. The other wire leads from the contact assembly 208 to the switch 196 and from the switch 196 to the motor 50.

The operation of the battery-powered grease gun 20 according to this embodiment is, as described above, by manual manipulation of the trigger 30 for moving the switch 196 to an "on" position to energize the motor 50. The motor 50 causes rotation of the drive gear 140 which rotation is transmitted to the yoke 160 by the action of the drive pin 154 engaging the inside peripheral surface of the cam slot 162 in the yoke 160. The yoke 160 is connected to the plunger 172 which reciprocates in the bore 170 forcing grease under pressure through the outlet passage 182. The grease is discharged through the hose 33 to a desired point of lubrication. However, if the discharge hose 33 is connected to a blocked grease fitting (not shown), grease will not flow, causing pressure to build in the bore 170 and the discharge hose 33. Because the electric motor 50 has to work against the pressure, the current passing through the thermal protector 250 increases, thereby increasing the temperature of the thermal protector 250. Eventually, the thermal protector 250 reaches a pre-calibrated temperature at which point the thermal protector 250 functions to open the circuit. It is understood that this temperature is reached during a fault condition caused by an increase in electric current flowing through the thermal protector 250 and not an increase in the ambient temperature. In the present configuration of the grease gun 20 described herein, the thermal protector 250 opens the circuit shortly after the pressure in the grease gun 20 reaches about 7000 psi.

After the thermal protector 250 breaks the circuit, the motor 50 stops and the thermal protector 250 cools. When the temperature of the thermal protector 250 is again below the pre-calibrated temperature, the thermal protector 250 will automatically reset. Because the ambient temperature is below the pre-calibrated temperature, the thermal protector 250 cools quickly and will reset within several seconds. If the user continues to actuate the trigger 30 for maintaining the switch 196 in the on position, power will again be delivered through the circuit for energizing the motor 50. If the grease fitting remains blocked, the current increases rapidly and the thermal protector 250 again opens the circuit. The thermal protector 250 will cool quickly and reset, and this cycle will repeat indefinitely. Importantly, each time the circuit cycles between the open condition and the closed condition, the pressure in the bore 170 and the discharge hose 33 of the grease gun 20 increases. As the thermal protector 250 continues to cycle, the pressure will continue to increase up to about 10,000 psi, after which there will be no further increase in pressure even if the thermal protector 250 continues to cycle. Moreover, it is understood that the high pressure generated by the cycling of thermal protector 250 increases the likelihood of clearing the blocked grease fitting.

It has been observed that when the thermal protector 250 opens the circuit, the high pressure in the bore 170 causes the plunger 172 to move upwardly in the bore 170 from a position where the plunger 172 has stalled, which always occurs during the pressure stroke. Since this is opposite to the direction of movement of the plunger during the pressure stroke when the grease gun 20 is powered, upward movement of the plunger 172 back drives the drive gear 140, transmission and electric motor 50 by the action of the drive pin 154 in the cam slot 162 of the yoke 160. As the plunger 172 retreats, additional grease is drawn into the bore 170 through the inlet passage 180. When the thermal protector 250 resets, the plunger 172 is driven downward in the bore 170, although the plunger 172 may or may not reach the previous stall position.

A suitable thermal protector for use in the battery-powered grease gun according to the present invention is available from Texas Instruments and sold under device code 7AM029A5-YYY. This thermal protector is pre-calibrated to open the circuit at a temperature of 110° C.+/−5° C. However, as described above, when the grease gun 20 is used with a blocked grease fitting, the fault condition of the thermal protector 250 is typically reached due to an increase in current rather than as a result of the ambient temperature reaching the pre-calibrated temperature. Thus, the cycling of the thermal protector 250 for building pressure in the grease gun 20 may be achieved using thermal protectors having a broad range of pre-calibrated opening temperatures. Preferably, the thermal protector 250 is selected to have a pre-calibrated opening temperature that is not reached during normal operation of the grease gun 20 in the absence of a blocked grease fitting.

Figure 9:
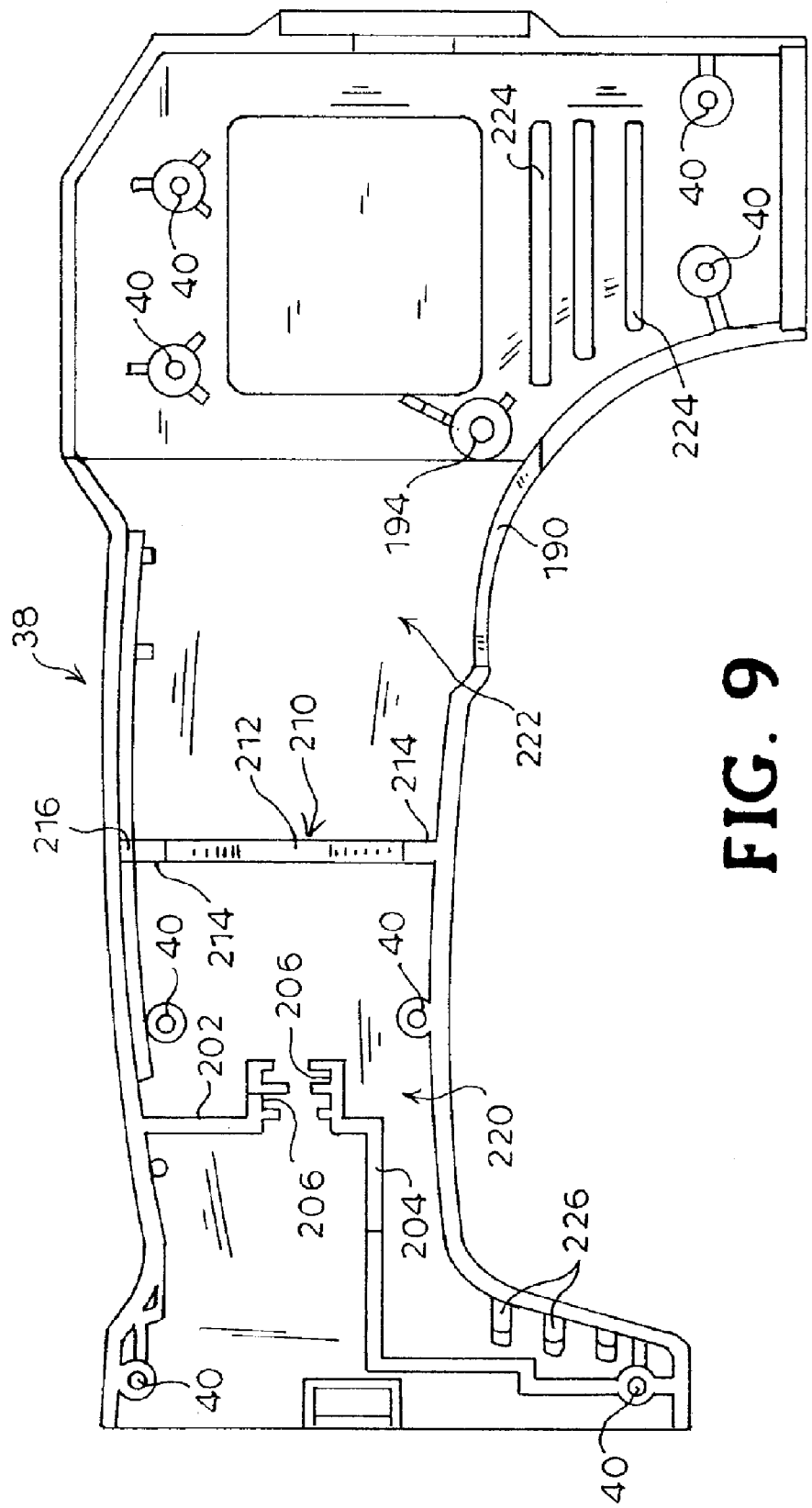
FIG. 9 is a side elevation view of a left hand handle part for use in the battery-powered grease gun according to the present invention.
Figure 11:
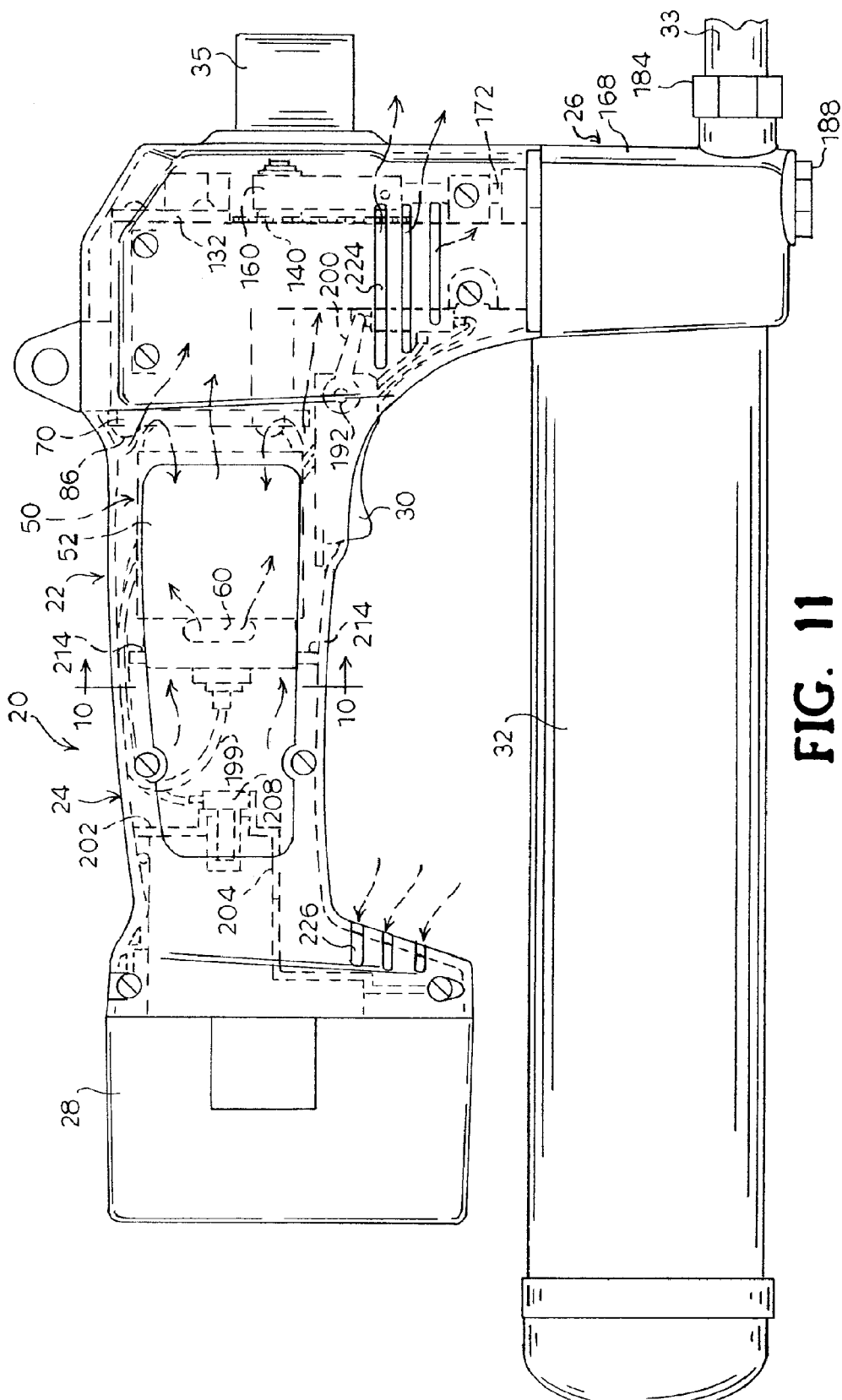
FIG. 11 is a side elevation view of the battery-powered grease gun shown in FIG. 1 with the internal components shown in phantom to depict air flow through the housing during operation of the battery-powered grease gun according to the present invention.

FIG. 9 shows the interior of the left hand handle part 38. It is understood that the interior of the right hand handle part 36 is a mirror image of the left hand handle part 38. The left hand handle part 38 includes inwardly projecting integral walls. An upper battery socket wall 202 and a lower battery socket wall 204 are formed at the rear end of the handle parts 38 and are configured to accommodate the battery pack 28. The inner ends of the battery socket walls 202, 204 have transverse slots 206 for receiving a contact assembly 208 for connection to the battery pack 28. A partition wall 210 extends radially inward in the handle 24 forward of the battery socket walls 202, 204. The partition wall 210 has a central semi-circular cutout 212. The internal walls of the handle 24 provide strength and rigidity to the handle 24.

Figure 10:
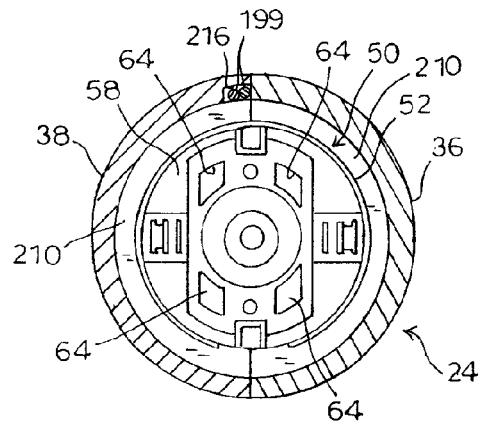
FIG. 10 is a cross section of the handle portion of the housing of the battery-powered grease gun shown in FIG. 1 and taken along line 10—10 of FIG. 11.

When the handle parts 36, 38 are assembled, the entire length of the battery socket walls 202, 204 and the straight lengths 214 of the partition walls 210 contact one another. The semi-circular cutouts 212 of the partition wall 210 define a central opening in the handle 24 which surrounds and seals against the periphery of the side wall 54 of the motor housing 52. As best seen in FIGS. 7 and 10, the partition walls 210 seal against the motor housing 54 adjacent to and rearward of the air ports 60 in the side wall 54. A slot 216 is formed in the partition wall 210 for allowing the wires 199 from the contact assembly 208 to pass. The slot 216 is sized to minimize clearance between the wires 218 and the partition 210 (FIG. 9).

The partition wall 210 divides the interior of the handle 24 into two separate chambers when the handle parts 36, 38 are joined. Specifically, a chamber 220 is formed in the rear portion of the handle 24 upstream of the motor 50. The upstream chamber 220 is defined by the interior surface of the rear portion of the handle 24, the partition wall 210 and the upper and lower battery socket walls 202, 204. Forward of the partition wall 210 is an exhaust air chamber 222 defined by the interior surface of the forward portion of the handle 24, the partition wall 210 and the exterior surface of the head 26. Air vents 224, 226 are formed in the front portion and rear portion of the handle 24. The exhaust chamber 222 and the upstream chamber 220 are in communication with the atmosphere via the vents 224, 226 in the front and rear portions of the handle, respectively.

Air flow through the housing 22 is generated by rotation of the fan on the motor shaft 66 when the motor is running. Referring to FIGS. 1, 5, 6 and 11, dotted lines with arrows in the Figures show the direction of air flow through the housing 22. The motor fan draws ambient air from outside of the housing 22 through the inlet air vents 226 in the rear portion of the handle 24. Air flows forwardly into the inlet ports 64 in the rear end wall 58 of the motor housing 52. The partition wall 210 directs substantially all of the air drawn into the rear portion of the handle 24 into the motor housing 52 for cooling the motor 50. As described above, air flows through the motor 50 and is discharged from the ports 60 in the side wall 54 into the exhaust chamber 222.

A portion of the warmed air exiting the motor housing 52 through the exhaust ports 60 flows along the outer surface of the motor housing 52, into the ports 62 in the front end wall 56 and again through the motor housing 52 to be discharged from the side wall ports 60. The remainder of the exhausted air flows lengthwise of the handle 24 cooling the exhaust chamber 222 of the handle 24 and head 26 prior to exiting the housing 22 through the outlet vents 224 to the ambient. The periphery of the motor housing 52 and mounting plate 70 do not extend to the interior surface of the handle 24 for defining an annular space between the periphery of the motor housing 52 and mounting plate 70 and the interior surface of the handle 24 for the passage of air. The partition wall 210 substantially prevents the re-circulated exhaust air from returning to the upstream chamber 220 in the rear portion of the handle 24. Where the cross-sectional area of the mounting plate 70 is greater than the cross-sectional area of the motor housing 52, as in the embodiment of the present invention shown in the Figures, the mounting plate 70 may function to deflect a portion of the motor exhaust air radially of the motor housing 52 (FIG. 6). The recesses 76 in the mounting plate 70 induce a portion of the deflected air to flow into the ports 62 in the front end wall 56.

It is understood that the structure of the interior of the handle 24 generally confines the air flow through the housing 22 to the path described. The channeled air flow acts to cool the motor 50 to a sufficiently low temperature to prevent excessive heat buildup in the motor housing 52 and handle 24, which would otherwise be detrimental to either the motor 50 or the housing 22, particularly a plastic housing, and cause discomfort to the user. This extends the life of the tool components. Moreover, this arrangement allows the placement of the motor 50 in the handle 24 of the grease gun 20. Placing the motor 50, battery pack 28, and transmission in the handle provides a compact, balanced design for any power tool. In a grease gun, wherein the handle 24 is oppositely positioned relative to the grease reservoir 32, a weight distribution is now available that enables the grease gun 20 to be more easily manipulated while gripping the handle 24.

Although the present invention has been shown and described in considerable detail with respect to only a few exemplary embodiments thereof, it should be understood by those skilled in the art that we do not intend to limit the invention to the embodiments since various modifications, omissions and additions may be made to the disclosed embodiments without materially departing from the novel teachings and advantages of the invention, particularly in light of the foregoing teachings. For example, any number of planetary gear stages could be used in the transmission depending on the motor construction. Further, the handle construction channeling air flow can be used in a power tool that does not use a planetary gear system in the transmission. Accordingly, we intend to cover all such modifications, omission, additions and equivalents as may be included within the spirit and scope of the invention as defined by the following claims. In the claims, means-plus-function clauses are intended to cover the structures described herein as performing the recited function and not only structural equivalents but also equivalent structures. Thus, although a nail and a screw may not be structural equivalents in that a nail employs a cylindrical surface to secure wooden parts together, whereas a screw employs a helical surface, in the environment of fastening wooden parts, a nail and a crew may be equivalent structures.

What is claimed is:

1. A grease gun for use in enhancing the pressure applied to a blocked grease fitting, the grease gun comprising:
    a housing including a handle portion and a head portion, the head portion having a bore forming a pump cylinder and an inlet passage and an outlet passage extending from the exterior of the head portion and opening into the bore, the outlet passage opening into the bore at a point axially spaced in a first direction from the opening of the inlet passage into the bore;
    a grease supply cylinder sealingly secured to the head portion so that the bore is in fluid communication with the grease in the supply cylinder;
    a discharge hose in fluid communication with the outlet passage for delivering grease to the grease fitting;
    an electric motor disposed within the housing, the motor including a shaft;
    a battery;
    a circuit interconnecting the battery and the motor, the circuit including
    a switch operable by a user holding the fluid dispensing dispenser in his hand for manually activating the motor when the switch is actuated, and
    a thermal protector for breaking the circuit at a predetermined temperature;
    a transmission disposed within the housing and operably connected to the motor, the transmission comprising
    a planetary gear assembly including an output gear, and
    a drive gear meshing with the output gear, the drive gear including a drive pin eccentrically mounted on a face of drive gear and projecting outwardly from the face of the drive gear;
    a yoke having a cam slot for receiving the drive pin for reciprocation of the yoke by the drive pin upon rotation of the drive gear; and
    a piston fastened to the yoke at one end and the other end of the piston slidably disposed in the bore for reciprocal movement relative to the housing between a first position axially spaced in a second direction from the opening of the inlet passage into the bore and a second position past the inlet passage opening in the first direction, the piston moving toward the outlet passage opening in the first direction through a pumping stroke for forcing the grease in the bore out through the outlet passage opening and into the discharge hose, and away from the outlet passage and past the inlet passage opening in the second direction through a return stroke for priming the bore,
    wherein, when the switch is continuously actuated, the thermal protector cycles between an open circuit condition and a closed circuit condition when the discharge hose is connected to a blocked grease fitting, the pressure in the bore and discharge hose increasing each time the thermal protector resets to the open circuit condition up to a maximum pressure.

2. A grease gun as recited in claim 1, wherein the planetary gear assembly comprises:
    a carrier having opposite drive and driven surfaces and mounted in the housing for rotation relative to the housing, the carrier including
    a support axially extending from the drive surface,
    the output gear axially extending from the cylindrical support,
    a cylindrical distal end portion axially extending from the output gear and rotatably received in an annular opening in the housing, and
    a plurality of planet gears mounted for rotation on the driven surface around a sun gear directly or indirectly driven by the motor, at least some of the planet gears meshing with the sun gear;
    a bearing assembly positioned in the housing between the peripheral surfaces of each of the cylindrical support and the cylindrical distal end portion of the carrier and the interior surface of the housing; and
    an orbit gear non-rotatably mounted in the housing, the planetary gears of the carrier meshing with the orbit gear so that rotation of at least some of the planet gears relative to the carrier by the sun gear causes the carrier to rotate relative to the orbit gear.

3. A grease gun as recited in claim 2, wherein the planetary gear assembly further comprises:
    a second carrier having opposite drive and driven surfaces and mounted in the housing for rotation relative to the housing, the second carrier including
    the sun gear extending from the drive surface, and
    a plurality of planet gears mounted for rotation on the driven surface of the second carrier around a second sun gear directly or indirectly driven by the motor, at least some of the planet gears on the second carrier meshing with the second sun gear, the planet gears of the second carrier also meshing with the orbit gear so that rotation of at least some of the planet gears relative to the second carrier by the sun gear causes the carrier to rotate relative to the orbit gear.

4. A grease gun as recited in claim 3, wherein the second sun gear meshing is fixed to the motor shaft.

5. A grease gun as recited in claim 1, wherein the drive gear comprises an axial shaft extending from the rear surface of the drive gear, the axial shaft rotatably received in an annular opening in the housing, and further comprising a bearing assembly positioned in the housing between the peripheral surface of the drive gear shaft and the interior surface of the housing.

6. A grease gun as recited in claim 1, wherein the cam slot is arcuate.

7. A grease gun as recited in claim 1, wherein the cam slot is substantially linear.

8. A method for operating a grease gun comprising a housing including a handle portion and a head portion, the head portion having a bore forming a pump cylinder and an inlet passage and an outlet passage extending from the exterior of the head portion and opening into the bore, the outlet passage opening into the bore at a point axially spaced in a first direction from the opening of the inlet passage into the bore, and a grease supply sealingly secured to the head portion so that the bore is in fluid communication with the grease the supply, the housing accommodating an electric motor including a shaft; a battery; a circuit interconnecting the battery and the motor, the circuit including a switch operable by a user holding the fluid dispensing dispenser in his hand for manually activating the motor when the switch is actuated; a transmission operably connected to the motor, the transmission comprising a planetary gear assembly including an output gear, and a drive gear meshing with the output gear, the drive gear including a drive pin eccentrically mounted on a face of drive gear and projecting outwardly from the face of the drive gear; a yoke having a cam slot for receiving the drive pin for reciprocation of the yoke by the drive pin upon rotation of the drive gear; and a piston fastened to the yoke at one end and the other end of the piston slidably disposed in the bore for reciprocal movement relative to the housing between a first position axially spaced in a second direction from the opening of the inlet passage into the bore and a second position past the inlet passage opening in the first direction, the piston moving toward the outlet passage opening in the first direction through a pumping stroke for generating pressure in the bore for forcing the grease in the bore out through the outlet passage opening, and away from the outlet passage and past the inlet passage opening in the second direction through a return stroke for priming the bore, the method comprising the steps of:

providing a thermal protector for breaking the circuit at a predetermined temperature;

actuating the switch;

maintaining the switch in the actuated position until the thermal protector reaches the predetermined temperature and breaks the circuit; and continuing to maintain the switch in the actuated position until the thermal protector resets for completing the circuit and again energizing the motor, wherein the pressure in the grease gun increases.

\* \* \* \* \*